United States Patent [19]

Komatsu

[11] Patent Number: 5,617,562
[45] Date of Patent: Apr. 1, 1997

[54] RECEIVING CIRCUIT RESET UPON RECEPTION OF BURST DATA AND TRANSMISSION/RECEPTION SYSTEM UTILIZING THE SAME

[75] Inventor: Masatoshi Komatsu, Tokyo, Japan

[73] Assignee: NEC Corporation, Japan

[21] Appl. No.: 315,108

[22] Filed: Sep. 29, 1994

[30] Foreign Application Priority Data

Oct. 1, 1993 [JP] Japan .................................. 5-246748

[51] Int. Cl.⁶ .................................................. G06F 13/42
[52] U.S. Cl. .................................. 395/559; 395/881
[58] Field of Search .................... 395/550, 878–881

[56] References Cited

U.S. PATENT DOCUMENTS

4,426,685  1/1984  Lorentzen ........................ 395/550
4,884,286  11/1989  Szcdzepanek et al. ........... 375/118
5,287,025  2/1994  Nishimichi ....................... 307/603

Primary Examiner—Thomas M. Heckler
Attorney, Agent, or Firm—Ostrolenk, Faber, Gerb & Soffen, LLP

[57] ABSTRACT

A transmission and reception system includes a transmitting unit and a receiving unit. The transmitting unit transmits a transmission signal including at least a data signal and a clock signal. The data signal is transmitted at a random timing. The receiving unit includes a delay unit for delaying the data signal by a predetermined time period in synchronous with the clock signal. A buffer unit operates in synchronous with the clock signal, temporally stores the data of the delayed data signal and outputs the data. A control units operates in synchronous with the clock signal, controls the storing and outputting operations of the buffer unit. A reset unit operates in synchronous with the clock signal, supplies a reset signal at start timing of the data signal to reset the control unit.

15 Claims, 9 Drawing Sheets

Fig. 15A CLK
Fig. 15B DATAO
Fig. 15C DP
Fig. 15D DDP (DRS)
Fig. 15E DDATAO
Fig. 15F FR
Fig. 15G SD
Fig. 15H DOE

RECEIVING CIRCUIT RESET UPON RECEPTION OF BURST DATA AND TRANSMISSION/RECEPTION SYSTEM UTILIZING THE SAME

BACKGROUND OF THE INVENTION

1. Field of the Invention

The present invention relates to a receiving circuit and a transmission/reception system utilizing the same, more particularly, to a receiving circuit reset upon reception of burst data in a transmission/reception system in which the burst data and a clock signal are transmitted at least from a transmitting unit to a receiving unit.

2. Description of Related Art

Figure 1:
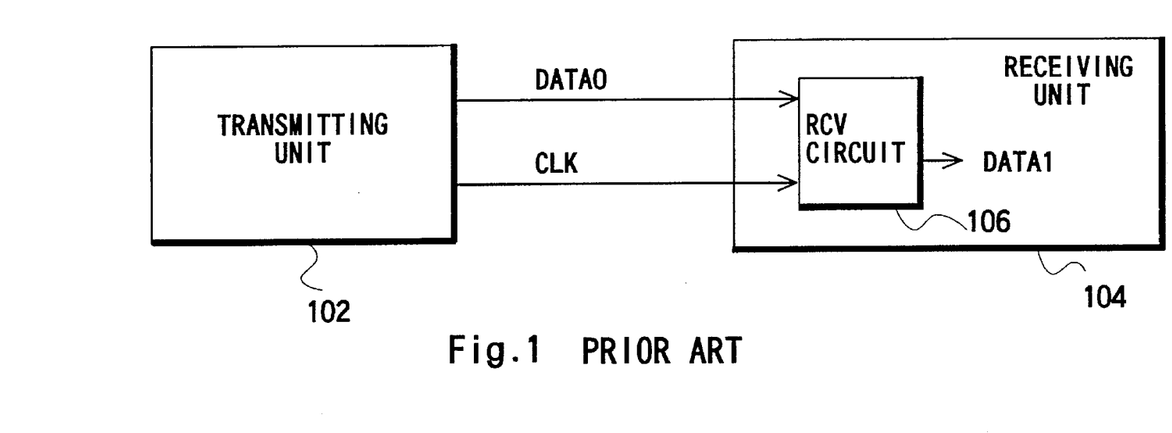
FIG. 1 is a diagram showing a conventional transmission/reception system.

FIG. 1 is a block diagram showing a conventional transmission/reception system. The system includes a transmitting unit 102 and a receiving unit 104 containing a receiving circuit 106. The transmitting unit 102 transmits a burst data signal DATA0 and a clock signal CLK to the receiving unit 104. The receiving circuit 106 receives these signals and outputs a data signal DATA1 from these signals. The system is used in a computer system, for instance. In this case, a computer corresponds to the transmitting unit and a unit for receiving data from the computer corresponds to the receiving unit.

Figure 2:
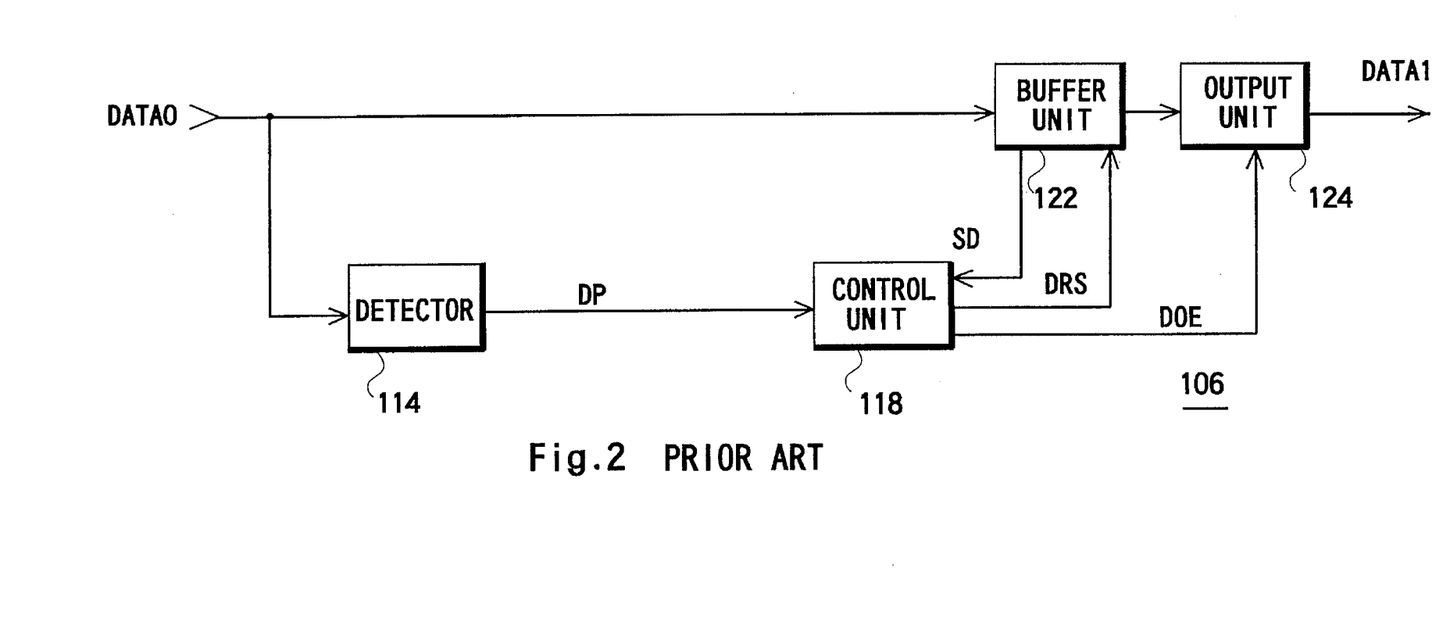
FIG. 2 is a diagram showing a receiving circuit included in the transmission/reception system shown in FIG. 1.

FIG. 2 is a block diagram showing the receiving circuit 106. The receiving circuit 106 includes a detector 114, a control unit 118, a buffer unit 122, and an output unit 124. All of these units are supplied with the clock signal CLK and operates in synchronously with the clock signal. The detector 114 receives the data DATA0 from the transmitting unit 102 to detect whether there is the burst data, and generates a signal DP indicating the presence of burst data when it is determined that the burst data is present. The buffer unit 122 also receives the data DATA0 from the transmitting unit 102 in response to a signal DRS from the control unit 118 to store it therein. Also, the buffer unit 122 generates a signal SD while the burst data is stored or held therein. The output unit 124 outputs the stored data from the buffer unit 122 as data DATA1 in response to a signal DOE from the control unit 118. The control unit 118 controls the detector 114, the buffer unit 122, and the output unit 124. More particularly, the control unit 118 receives the signal DP from the detector to generate the signal DRS indicating that the burst data is to be stored in the buffer unit 122. The control unit 118 generates the signal DOE in response to the signal SD from the buffer unit 122 and the signal DP from the detector 114.

Figure 3:
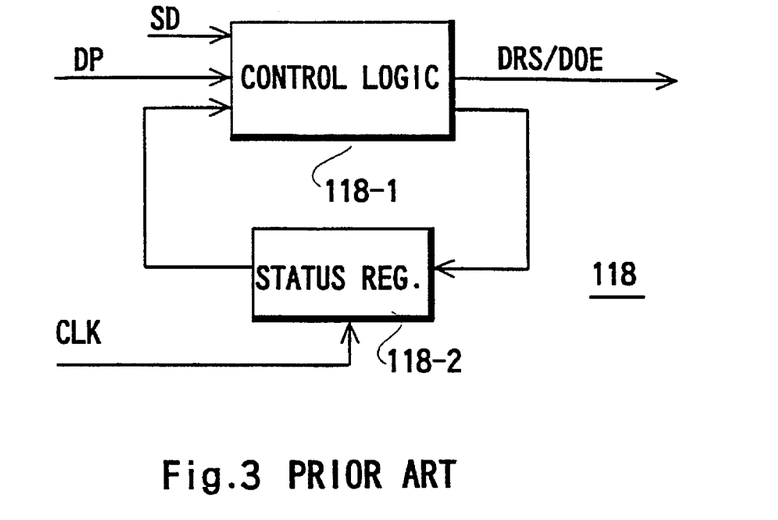
FIG. 3 is a diagram showing a control unit of the receiving circuit shown in FIG. 2.

FIG. 3 is a block diagram of the control unit 118. The control unit 118 includes a control logic unit 118-1 and a status register 118-2. The status register 118-2 stores the status of the receiving circuit 106 in response to the clock signal CLK. The control logic unit 118-1 generates the control signals DRS and DOE in accordance with the signals DP and SD and the current status stored in the register 118-2.

Figure 4:
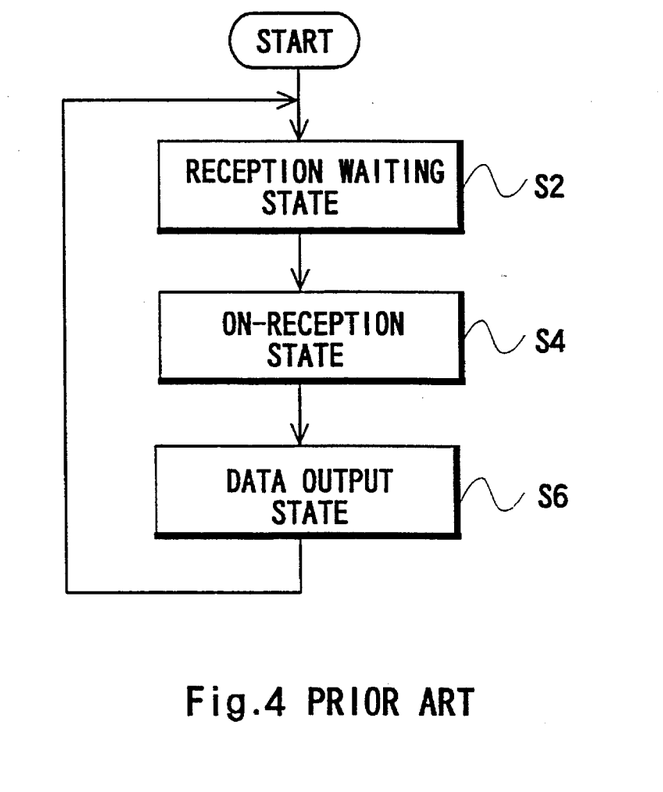
FIG. 4 is a state transition diagram of the receiving circuit shown in FIG. 2.

FIG. 4 is a state transition diagram of the receiving circuit 106. The receiving circuit 106 waits for burst data in the state S2. When the burst data is transmitted from the transmitting unit 102 to the receiving unit 104, the state changes to an on-reception state S4 because the detector detects the burst data to issue the signal DP to the control unit 118. When the transmission of burst data is completed, i.e., when the signal DP indicates that there is no data, the control unit 118 changes the state to the data output state S6 in accordance with the signal SD to issue the signal DOE to the output unit 124 so that the data stored in the buffer unit is outputted as the DATA1.

However, in this conventional receiving circuit, in a case where the clock signal is distorted due to the application of noise on the transmission path, a clock signal having a high clock rate would be determined to be inputted. When there is inputted to the receiving circuit such a clock signal having a shorter clock pulse than a width of the clock pulse contained in the normal clock signal, the control circuit 118 transits to an abnormal state so that the operation is in a fault state. In this case, flip-flop circuits needs to be reset, and unless the flip-flop circuit are not reset the control unit is not recovered to the normal state.

SUMMARY OF THE INVENTION

The present invention is made under the above circumstances.

The first aspect of the present invention is to provide a receiving circuit in which a control circuit contained therein is reset each time a data is inputted so that the data can be received even if a clock signal is distorted due to noise.

The second aspect of the present invention is to provide a transmission/reception system including the receiving circuit described in the first aspect.

The third aspect of the present invention is to provide a method in which a control unit is reset when a burst data is received, so that the burst data can be reliably received.

The fourth aspect of the present invention is to provide a receiving circuit in which flip-flop circuits operating in synchronous with a clock signal are reset immediately before a data is received.

A receiving circuit according to the present invention receives a transmission signal including at least a data signal and a clock signal and outputs data based on the received signals. The data signal is transmitted at a random timing. The receiving circuit includes a delay unit for delaying the data signal by a predetermined time period in synchronous with the clock signal. The buffer unit operates in synchronous with the clock signal and receives the data signal delayed by the delay unit to temporally stores the data of the delayed data signal in response to a control signal from the control unit and to output the data in response to a control signal from the control unit. The control unit also operates in synchronous with the clock signal and generates the control signals to control the storing and outputting operations of the buffer unit. The reset unit operates in synchronous with the clock signal and supplies a reset signal at start timing of the data signal to reset the control unit before the control of the buffer unit. The predetermined time period is determined based on a time period required to reset the control unit.

As seen from the above, according to the present invention, the receiving circuit can be normally operated even if the clock signal is deteriorated because the receiving circuit is reset each time the data signal is received.

DESCRIPTION OF THE PREFERRED EMBODIMENTS

The present invention will be described below with reference to the accompanying drawings.

First, with reference to FIG. 5, a transmission/reception system containing a receiving circuit according to the first embodiment of the present invention will be described.

Figure 5:
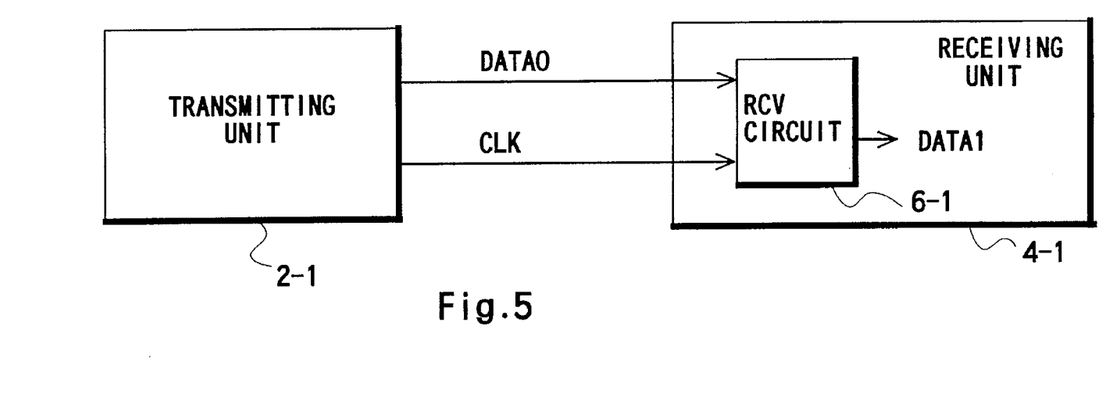
FIG. 5 is a diagram showing a transmission/reception system according to the first embodiment of the present invention.

FIG. 5 is a block diagram showing the transmission/reception system. The system includes a transmitting unit 2-1 and a receiving unit 4-1 containing a receiving circuit 6-1. The transmitting unit 2-1 transmits a burst data signal DATA0 with a preamble portion and a clock signal CLK to the receiving unit 4-1 as a transmission signal. The receiving circuit 6-1 receives these signals and outputs a data signal DATA1 from these signals.

Figure 6:
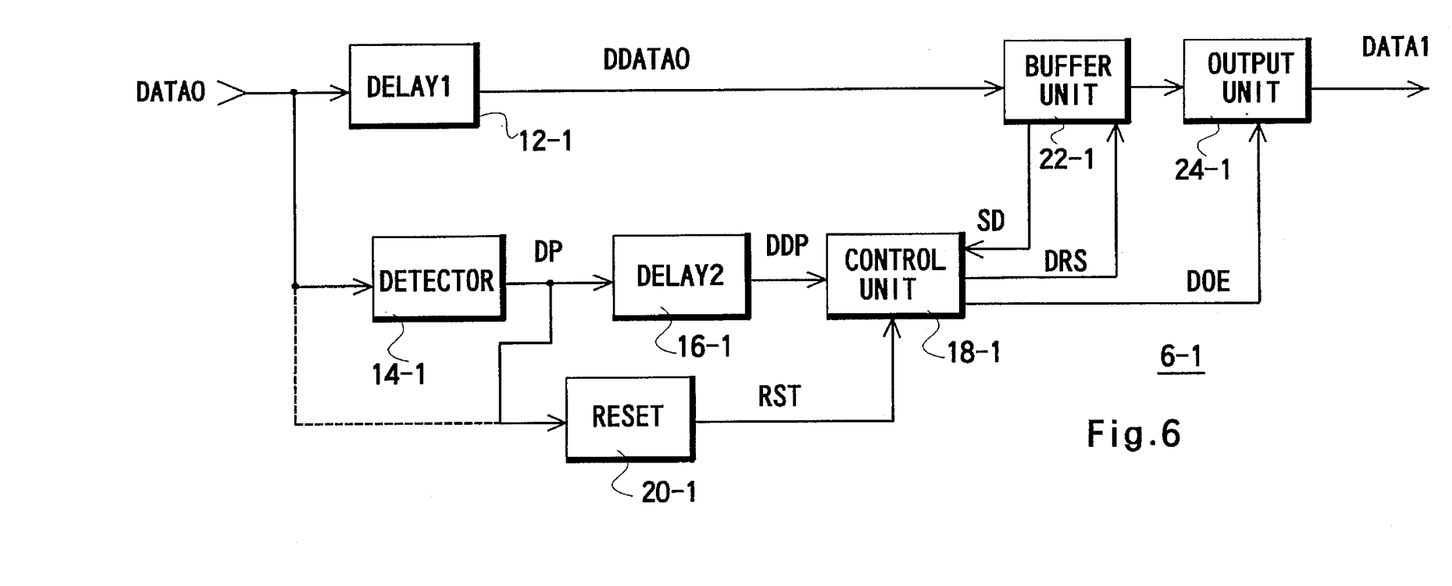
FIG. 6 is a diagram showing a receiving circuit included in the transmission/reception system shown in FIG. 5.

FIG. 6 is a block diagram showing the receiving circuit 6-1. The receiving circuit 6-1 includes a delay unit DELAY1 12-1, a detector 14-1, a delay unit DELAY2 16-1, a control unit 18-1, a reset unit 20-1, a buffer unit 22-1, and an output unit 24-1. All of these units are supplied with the clock signal CLK and operates in synchronous with the clock signal. The delay unit 12-1 receives the data DATA0 from the transmitting unit 2-1 and outputs data DDATA0 which is delayed from the data DATA0 by a predetermined period of time, e.g., two clock pulses of the clock signal CLK in this embodiment. The detector 14-1 receives the data DATA0 from the transmitting unit 102 to detect from the preamble portion whether there is the burst data, and generates a signal DP indicating the presence of burst data when it is determined that the burst data is present. The delay unit 16-1 receives the signal DP from the detector 14-1 and outputs a signal DDP which is delayed from the signal DP by the same time period as that of the delay unit 12-1, i.e., two clock pulses of the clock signal CLK. The control unit 18-1 controls the whole receiving circuit 6-1. More particularly, the control unit 118 receives the signal DDP from the delay unit 16-1 to generate a signal DRS indicating that the burst data is to be stored in the buffer unit 22-1. Also, the control unit 18-1 generates a signal DOE in response to a signal SD from the buffer unit 22-1 and the signal DDP from the delay unit 16-1 to supply it to the output unit 24-1. The reset unit 20-1 generates from the signal DP a signal RST to supply it to the control unit 18-1. The control unit 18-1 is reset in response to the signal RST. The buffer unit 22-1 receives the delayed data DDATA0 from the delay unit 12-1 in response to the signal DRS from the control unit 18-1 to store it therein. Also, the buffer unit 22-1 holds the signal SD in an active state while the burst data is stored or held therein. The output unit 24-1 outputs the stored data from the buffer unit 22-1 as data DATA1 in response to the signal DOE from the control unit 18-1.

Figure 7:
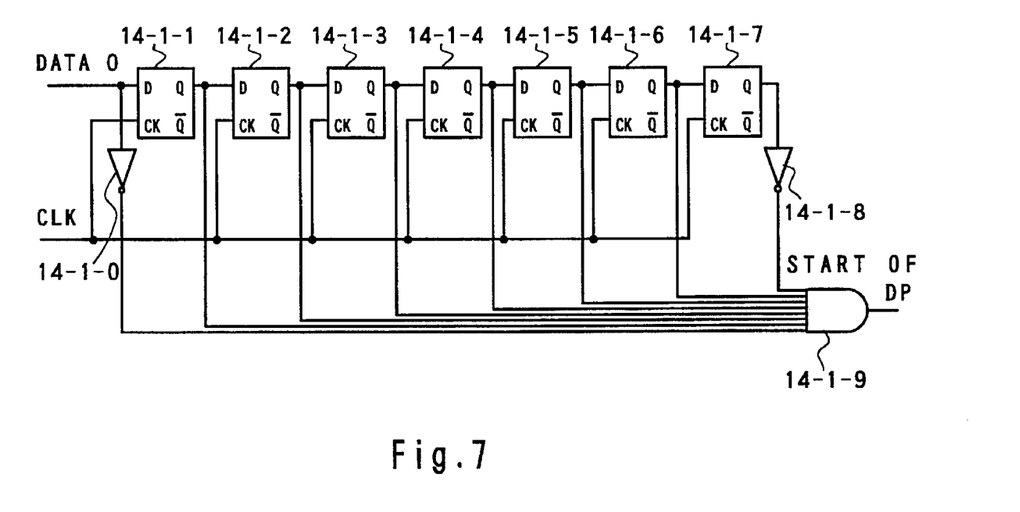
FIG. 7 is a diagram showing a detector included in the receiving circuit shown in FIG. 6.

FIG. 7 is a block diagram showing a portion of the detector 14-1 for detecting the start timing of data. The detector portion includes D-type flip-flops 14-1-1 to 14-1-7 connected in series via the Q-outputs, an invertor 14-1-0 provided before the flip-flop 14-1-1, an invertor 14-1-8 provided after the flip-flop 14-1-7, and an AND Gate 14-1-9 for inputting the outputs of the inserters 14-1-0 and 14-1-8 and the Q-outputs of the flip-flops 14-1-1 to 14-1-6. The clock signal CLK is supplied to the clock terminals of the flip-flops 14-1-1 to 14-1-7. The preamble portion preceding the burst data, i.e., a specific bit pattern "01111110" in this embodiment is supplied to the D-terminal of the flip-flop 14-1-1 and the input terminal of the invertor 14-1-0 and shifted one by one in synchronous with the clock signal CLK. This bit pattern is never used as the burst data. When the bit pattern is entirely received, the detector 14-1 detects the presence of the burst data and outputs the signal DP from the AND gate 14-1-9.

The detector 14-1 needs to detect the end timing of data after detecting the start timing of data to complete the signal DP. In order to detect the end timing of data there are generally the following three ways, which are already known, the first is the way in which the detector 14-1 detects the postamble having the same bit pattern as the preamble which postamble is added to the data by the transmitting unit 2-1, the second is the way in which information indicating data length is buried in the data, and the third is the way in which the data length is fixed. In the first way, the postamble may be different from the preamble. In the present embodiment, the first way is employed and the detector 14-1 produces the signal DP using the above detector portion.

Figure 8A:
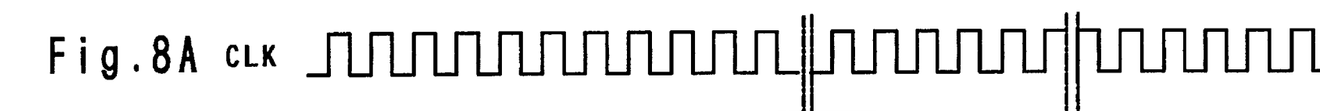
FIGS. 8A to 8H are timing charts showing the waveforms of signal CLK, signal DATA0, signal DP, signal DDP (DRS), signal DDATA0, signal RST, signal SD and signal DOE, respectively.
Figures 8B, 8C:
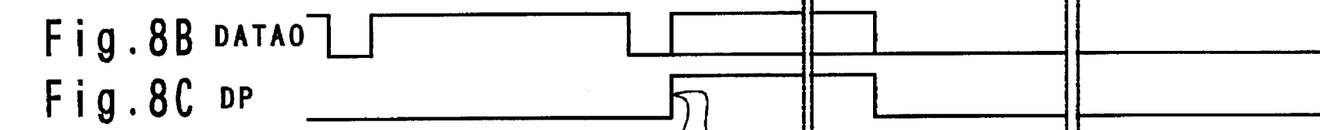
Figure 8D:
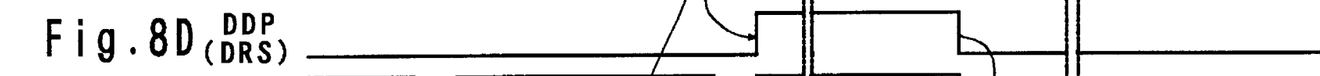
Figure 8E:
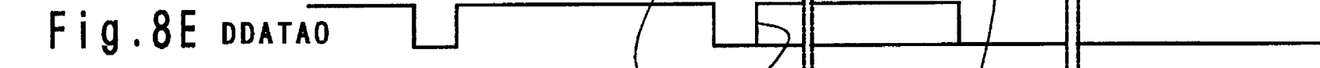
Figure 8F:
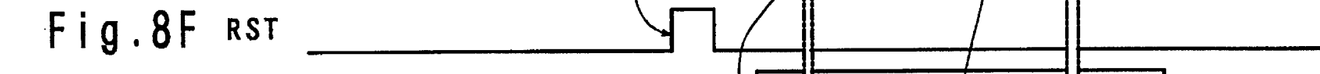
Figures 8G, 8H:
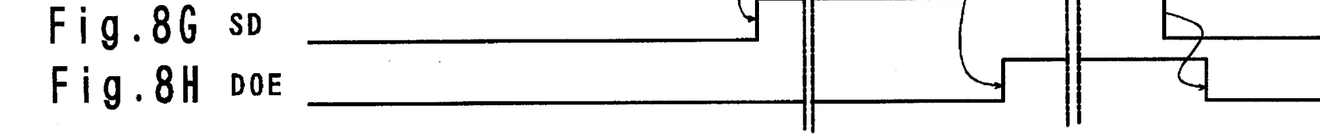

Next, an operation of the receiving circuit 6-1 will be described with reference to FIGS. 8A to 8H. The data DATA0 and the clock signal CLK are transmitted from the transmitting unit 2-1 as shown in FIGS. 8A and 8B. The data DATA0 is delayed by the delay unit 12-1 by two clock pulses to generate the signal DDATA0 as shown in FIG. 8E. The detector 14-1 detects the preamble portion in the abovementioned manner to generate the signal DP as shown in FIG. 8C, which is supplied to the delay unit 16-1 and the reset unit 20-1. The signal RST is generated by the reset unit 20-1 in response to the signal DP and the control unit 18-1 is reset to an initial state in response to the signal RST. Thus, the control unit 18-1 is always reset prior to the reception of the burst data. The signal DP is delayed by two clock pulses by the delay unit 16-1 as shown in FIG. 8D, so that the signal DDP is generated. The DRS is generated by the control unit 18-1 in correspondence with the signal DRS which is supplied to the buffer unit 22-1. The delayed data DDATA0 is supplied to the buffer unit 22-1 and stored therein in response to the signal DRS. Because the delay time of the delay unit 12-1 is the same as that of the delay unit 16-1, the data can be stored in the buffer unit 22-1. When there is not the burst data, the signal DP is reset as shown in FIG. 8C, so that the signal DDP is also reset. When the signal SD is active, i.e., when any data is still stored in the buffer unit 22-1, the signal DOE is generated by the control unit 18-1 in response to the falling edge of the signal DDP and supplied to the output unit 24-1. The data stored in the buffer unit 22-1 is outputted as the data DATA1 by the output unit 24-1 in response to the signal DOE. The signal SD is held in the active state while data is stored in the buffer unit 22-1 and is reset when the data is no more stored in the buffer unit 22-1. Therefore, the signal DOE is reset in response to the falling edge of the signal SD.

It should be noted that if the reset unit 20-1 includes the same structure as in the detector 14-1, the reset unit 20-1 may be connected to the signal DATA0 instead of the detector 14-1, as shown by a dashed line in FIG. 6.

Next, the receiving circuit according to the second embodiment of the present invention will be described.

Figure 9:
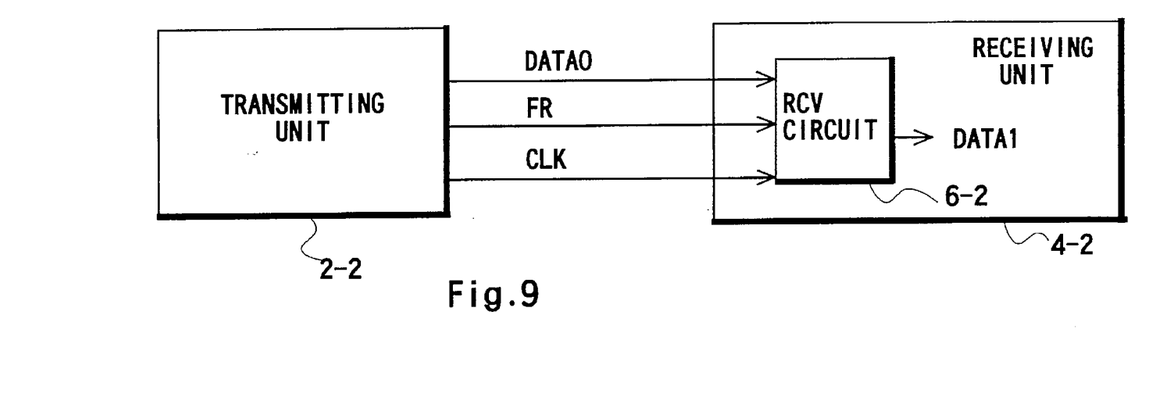
FIG. 9 is a diagram showing a transmission/reception system according to the second embodiment of the present invention.

FIG. 9 is a block diagram showing the transmission/reception system. The system includes a transmitting unit 2-2 and a receiving unit 4-2 containing a receiving circuit 6-2. The transmitting unit 2-2 transmits a burst data signal DATA0 with no preamble portion, a frame signal FR and a clock signal CLK to the receiving unit 4-2. The receiving circuit 6-1 receives these signals and outputs a data signal DATA1 from these signals. The frame signal FR indicates the duration of burst data and corresponds to the signal DP in the first embodiment.

Figure 10:
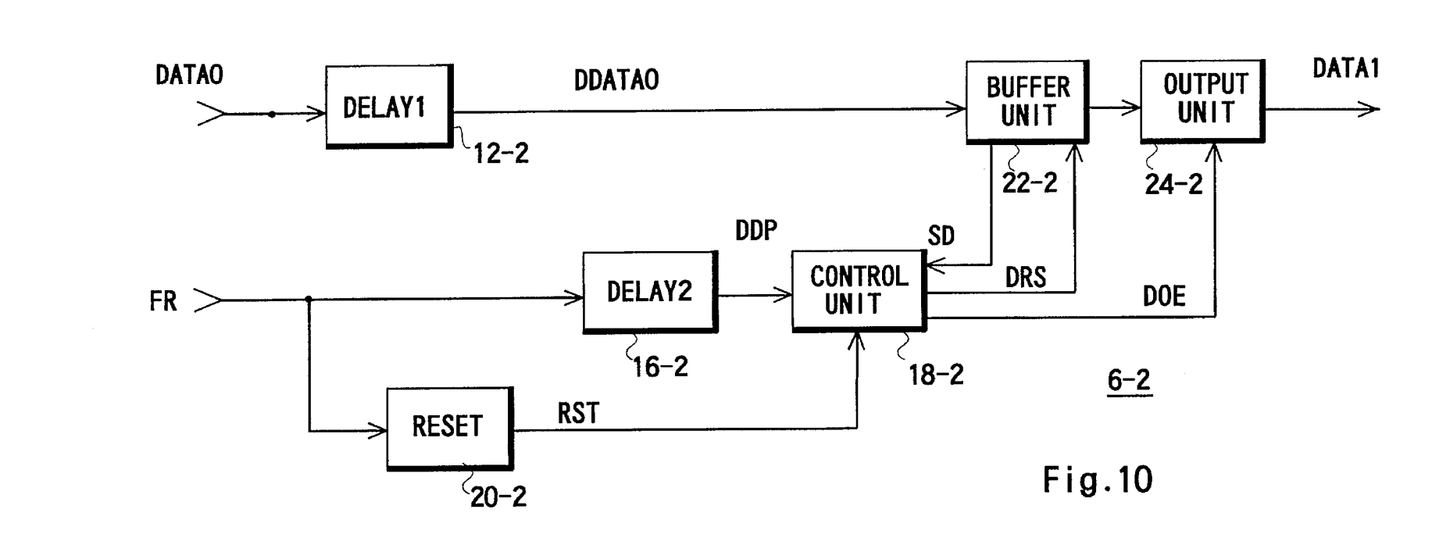
FIG. 10 is a diagram showing a receiving circuit included in the transmission/reception system shown in FIG. 9.

FIG. 10 is a block diagram showing the receiving circuit 6-2. The receiving circuit 6-2 includes a delay unit DELAY1 12-2, a delay unit DELAY2 16-2, a control unit 18-2, a reset unit 20-2, a buffer unit 22-2, and an output unit 24-2. All of these units are supplied with the clock signal CLK and operates in synchronous with the clock signal. Because the signal FR corresponds to the signal DP in the first embodiment, the detector is omitted. The delay unit 12-2 receives the data DATA0 from the transmitting unit 2-2 and outputs data DDATA0 which is delayed from the data DATA0 by a predetermined period of time, e.g., two clock pulses of the clock signal CLK in this embodiment. The delay unit 16-2 receives the signal FR from the transmitting unit 2-2 and outputs a signal DDP which is delayed from the signal FR by the same time period as that of the delay unit 12-2, i.e., two clock pulses of the clock signal CLK. The control unit 18-2 controls the whole receiving circuit 6-2. More particularly, the control unit 18-2 receives the signal DDP from the delay unit 16-2 to generate a signal DRS indicating that the burst data is to be stored in the buffer unit 22-2. Also, the control unit 18-2 generates a signal DOE in response to a signal SD from the buffer unit 22-1 and the signal DDP from the delay unit 16-2 to supply it to the output unit 24-2. The reset unit 20-2 generates from the signal FR a signal RST to supply it to the control unit 18-2. The control unit 18-2 is reset in response to the signal RST. The buffer unit 22-2 receives the delayed data DDATA0 from the delay unit 12-2 in response to the signal DRS from the control unit 18-2 to store it therein. Also, the buffer unit 22-2 holds the signal SD in an active state while the burst data is stored therein. The output unit 24-2 outputs the stored data from the buffer unit 22-2 as data DATA1 in response to the signal DOE from the control unit 18-2.

Figure 11:
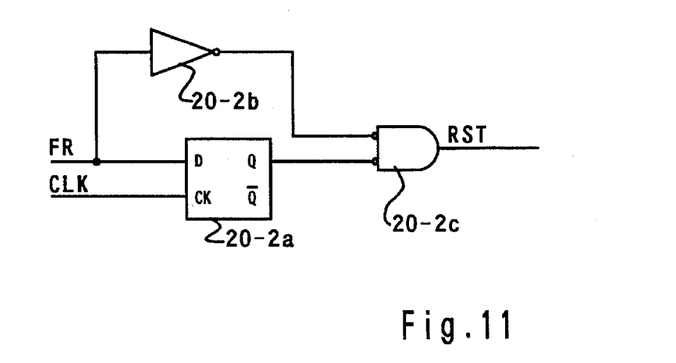
FIG. 11 is a diagram showing a reset unit included in the receiving circuit shown in FIG. 10.

FIG. 11 is a block diagram showing the reset unit 20-2. The reset unit includes a D-type flip-flop 20-2a, an inverter 20-2b and a NOR 20-2c. The clock signal CLK is supplied to the clock terminal of the flip-flop 20-2a.

Figure 12A:
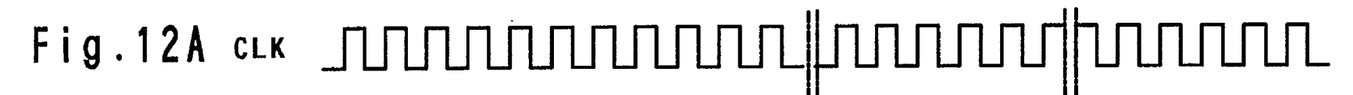
FIGS. 12A to 12H are timing charts showing the waveforms of signal CLK, signal DATA0, signal FR, signal DDP (DRS), signal DDATA0, signal RST, signal SD and signal DOE, respectively.
Figure 12B:
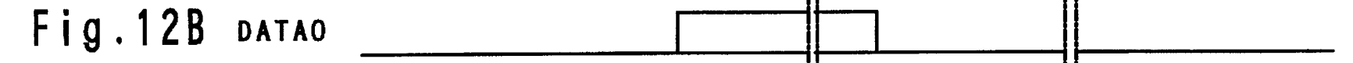
Figure 12C:
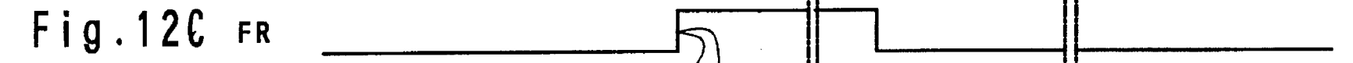
Figure 12D:
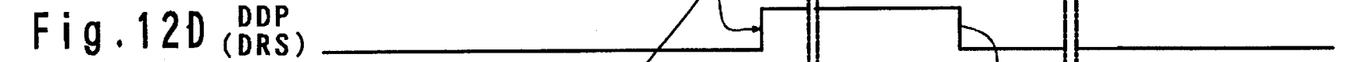
Figure 12E:
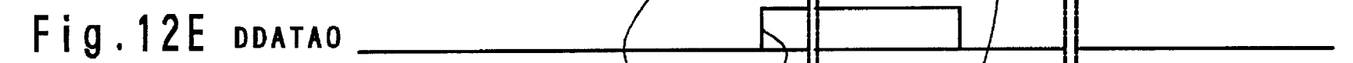
Figure 12F:
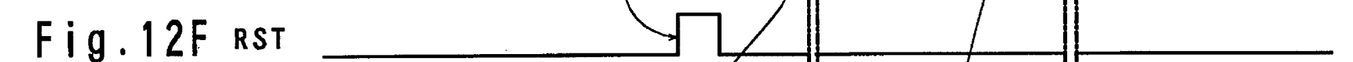
Figure 12G:
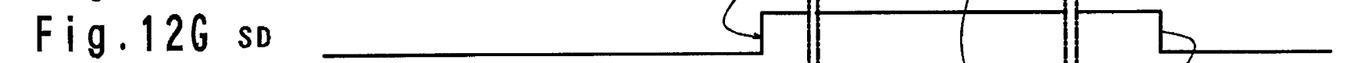
Figure 12H:
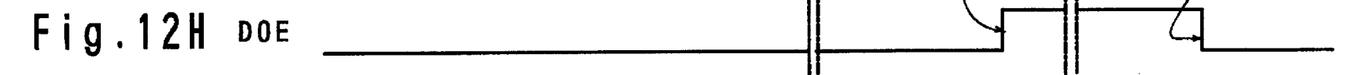

Next, an operation of the receiving circuit 6-2 will be described with reference to FIGS. 12A to 12H. The data DATA0, the signal FR and the clock signal CLK are transmitted from the transmitting unit 2-2 as shown in FIGS. 12A, 12B and 12C. The data DATA0 is delayed by the delay unit 12-2 by two clock pulses to generate the signal DDATA0 as shown in FIG. 12E. The signal FR is supplied to the delay unit 16-2 and the reset unit 20-2. The signal RST is generated by the reset unit 20-2 in response to the signal FR and the control unit 18-2 is reset to an initial state in response to the signal RST. Thus, the control unit 18-2 is always reset prior to the reception of the burst data. The signal FR is delayed by two clock pulses by the delay unit 16-2 as shown in FIG. 12D, so that the signal DDP is generated. The DRS is generated by the control unit 18-2 in correspondence with the signal DRS which is supplied to the buffer unit 22-2. The following description is the same as in the first embodiment and hence omitted.

Next, a transmission/reception system containing a receiving circuit according to the third embodiment of the present invention will be described.

Figure 13:
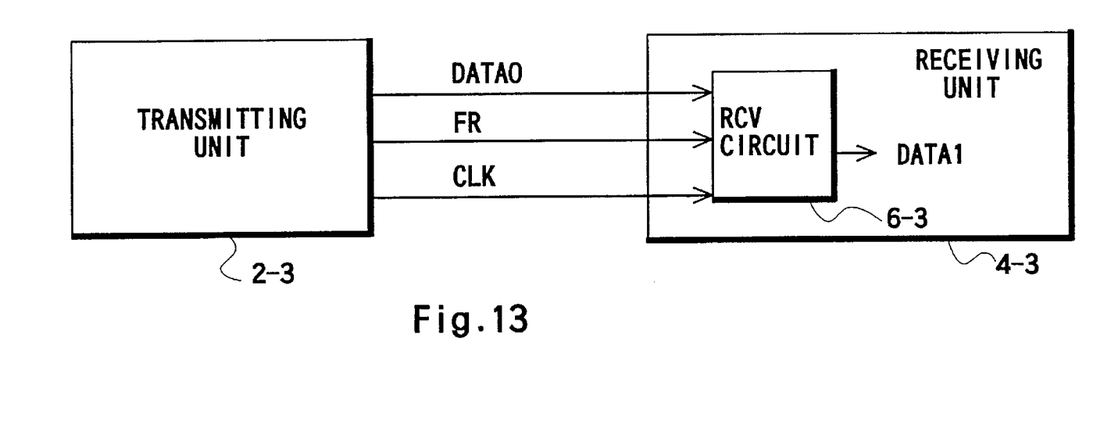
FIG. 13 is a diagram showing a transmission/reception system according to the third embodiment of the present invention.

FIG. 13 is a block diagram showing the transmission/reception system. The system includes a transmitting unit 2-3 and a receiving unit 4-3 containing a receiving circuit 6-3. The transmitting unit 2-3 transmits a burst data signal DATA0 with a preamble portion and a clock signal CLK to the receiving unit 4-3. The receiving circuit 6-3 receives these signals and outputs a data signal DATA1 from these signals.

Figure 14:
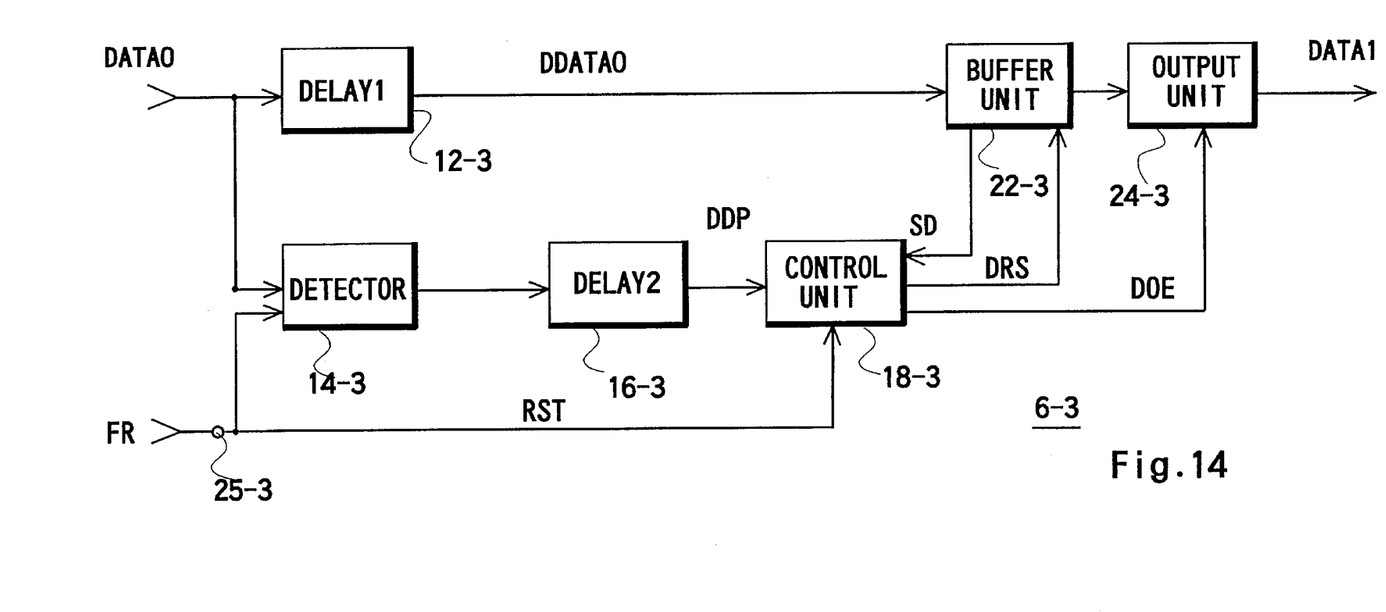
FIG. 14 is a diagram showing a receiving circuit included in the transmission/reception system shown in FIG. 13.

FIG. 14 is a block diagram showing the receiving circuit 6-3. The receiving circuit 6-3 includes a delay unit DELAY1 12-3, a detector 14-3, a delay unit DELAY2 16-3, a control unit 18-3, a buffer unit 22-3, and an output unit 24-3. All of these units are supplied with the clock signal CLK and operates in synchronous with the clock signal. The delay unit 12-3, the detector 14-3, the delay unit DELAY2 16-3, the control unit 18-3, the buffer unit 22-3, and the output unit 24-3 operates in the same manner as in the first embodiment. The signal FR is supplied to the detector 14-3 for detecting the start timing of data. Also, the signal FR is supplied to the control unit 18-3 via the terminal 25-3 as the reset signal RST so that the control unit 18-3 is reset in response to the signal RST.

Figures 15A, 15B:
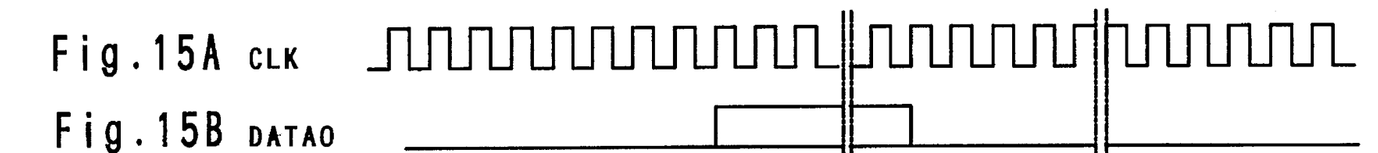
FIGS. 15A to 15H are timing charts showing the waveforms of signal CLK, signal DATA0, signal DP, signal DDP (DRS), signal DDATA0, signal FR, signal SD and signal DOE, respectively.
Figures 15C, 15D:
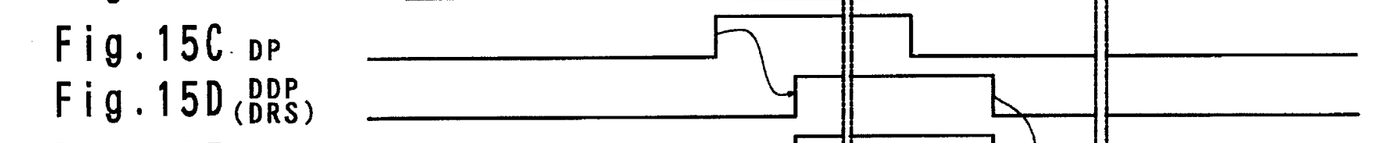
Figure 15E:
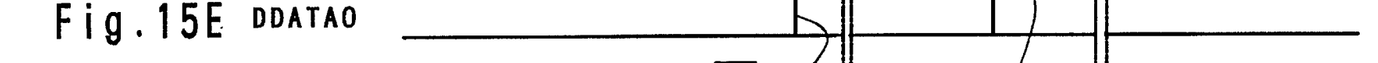
Figure 15F:
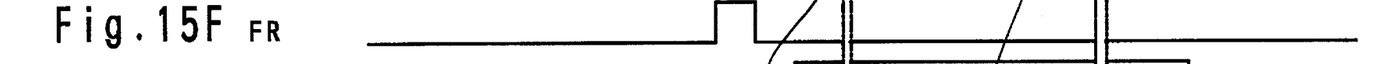
Figure 15G:
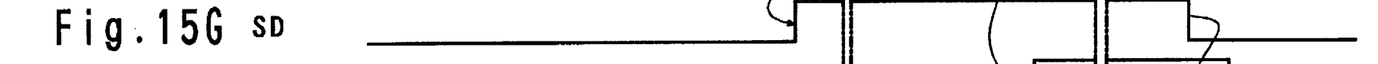
Figure 15H:
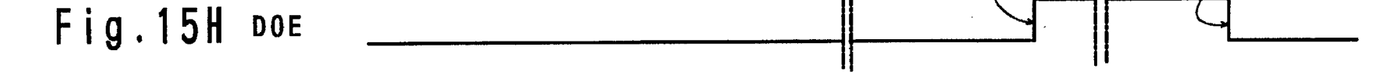

Next, an operation of the receiving circuit 6-3 will be described with reference to FIGS. 15A to 15H. As shown in FIG. 15F, the rising edge of the signal FR is synchronous with the burst data. The signal FR is supplied to the control unit 18-3 via the terminal 25-3 as the reset signal RST so that the control unit 18-3 is reset in response to the signal RST. The operations of the other units are the same as in the first embodiment.

In the above first and third embodiment, the data signal includes a preamble portion. However, if the detector 14-1 or 14-3 has a function for generating the signal DP from the data signal with no preamble portion the present invention can be applied.

What is claimed is:

1. A receiving circuit for receiving a transmission signal including at least a data signal and a clock signal to output data, the data signal being transmitted randomly, comprising:

delay means for delaying, synchronously with the clock signal, the data signal by a predetermined time period;

buffer means, operating synchronously with the clock signal, for temporally storing the data of the delayed data signal and outputting the data;

control means, operating synchronously with the clock signal, for controlling the storing and outputting operations of said buffer means; and resetting means, operating synchronously with the clock signal, for supplying a reset signal at start of the data signal to reset said control means, the predetermined time period being determined based on a time period required to reset said control means, the data signal includes a preamble portion having a predetermined bit pattern, said receiving circuit further comprises detecting means for detecting the preamble portion to generate a data presence signal, and said reset means includes means responsive to the data presence signal, for generating the reset signal.

2. A receiving circuit for receiving a transmission signal including at least a data signal and a clock signal to output data, the data signal being transmitted randomly, comprising:

delay unit to delay, synchronously with the clock signal, the data signal by a predetermined time period;

buffer unit, operating synchronously with the clock signal, to temporally store the data of the delayed data signal and to output the data;

control unit, operating synchronously with the clock signal, to control the storing and outputting operations of said buffer unit; and reset unit, operating synchronously with the clock signal, to supply a reset signal at start of the data signal to reset said control unit, the predetermined time period being determined based on a time period required to reset said control unit, the data signal includes a preamble portion having a predetermined bit pattern, said receiving circuit further comprises a detecting unit to detect the preamble portion to generate a data presence signal, and said reset unit includes a unit responsive to the data presence signal, to generate the reset signal.

3. A receiving circuit for receiving a transmission signal including at least a data signal and a clock signal to output data, the data signal being transmitted randomly, comprising:

delay means for delaying, synchronously with the clock signal, the data signal by a predetermined time period;

buffer means, operating synchronously with the clock signal, for temporally storing the data of the delayed data signal and outputting the data;

control means, operating synchronously with the clock signal, for controlling the storing and outputting operations of said buffer means; and resetting means, operating synchronously with the clock signal, for supplying a reset signal at start of the data signal to reset said control means, the predetermined time period being determined based on a time period required to reset said control means the transmission signal further includes a frame signal indicating a period of time when the data is present, and said reset means responsive to the frame signal, for generating the reset signal.

4. A receiving circuit for receiving a transmission signal including at least a data signal and a clock signal to output data, the data signal being transmitted randomly, comprising:

delay unit to delay, synchronously with the clock signal, the data signal by a predetermined time period;

buffer unit, operating synchronously with the clock signal, to temporally store the data of the delayed data signal and to output the data;

control unit, operating synchronously with the clock signal, to control the storing and outputting operations of said buffer unit; and reset unit, operating synchronously with the clock signal, to supply a reset signal at start of the data signal to reset said control unit, the predetermined time period being determined based on a time period required to reset said control unit, the data signal includes a preamble portion having a predetermined bit pattern, said receiving circuit further comprises a detecting unit to detect the preamble portion to generate a data presence signal, and said reset unit includes a unit responsive to the data presence signal, to generate the reset signal, the transmission signal further includes a frame signal indicating a period of time when the data is present, and said reset unit responsive to the frame signal, to generate the reset signal.

5. A receiving circuit for receiving a transmission signal including at least a data signal and a clock signal to output data, the data signal being transmitted randomly, comprising:

delay means for delaying, synchronously with the clock signal, the data signal by a predetermined time period;

buffer means, operating synchronously with the clock signal, for temporally storing the data of the delayed data signal and outputting the data;

control means, operating synchronously with the clock signal, for controlling the storing and outputting operations of said buffer means; and resetting means, operating synchronously with the clock signal, for supplying a reset signal at start of the data signal to reset said control means, the predetermined time period being determined based on a time period required to reset said control means the transmission signal further includes a frame signal indicating a start timing of a time period for which the data is present, and said reset means includes means responsive to the frame signal, for supplying the frame signal as the reset signal.

6. A receiving circuit for receiving a transmission signal including at least a data signal and a clock signal to output data, the data signal being transmitted randomly, comprising:

delay unit to delay, synchronously with the clock signal, the data signal by a predetermined time period;

buffer unit, operating synchronously with the clock signal, to temporally store the data of the delayed data signal and to output the data;

control unit, operating synchronously with the clock signal, to control the storing and outputting operations of said buffer unit; and reset unit, operating synchronously with the clock signal, to supply a reset signal at start of the data signal to reset said control unit, the predetermined time period being determined based on a time period required to reset said control unit, the data signal includes a preamble portion having a predetermined bit pattern, said receiving circuit further comprises a detecting unit to detect the preamble portion to generate a data presence signal, and said reset unit includes a unit responsive to the data presence signal, to generate the reset signal, the transmission signal further includes a frame signal indicating a start timing of a time period for which the data is present, and said reset unit includes a unit responsive to the frame signal, to supply the frame signal as the reset signal.

7. A method of receiving a transmission signal including at least a data signal and a clock signal to output data, the data signal being transmitted randomly, comprising the steps of:

resetting a control unit in response to a reset signal;

delaying the data signal, synchronously with the clock signal, by a time period required for resetting the control unit;

temporally storing the data of the delayed data signal, synchronously with the clock signal, under the control of the control unit; and outputting the data, synchronously with the clock signal, under the control of the control unit after the storing is completed the data signal includes a preamble portion having a predetermined bit pattern, and said method further comprises the step of detecting the preamble portion to generate a data presence signal, and said resetting step includes issuing the reset signal to said control unit in response to the data presence signal.

8. A method of receiving a transmission signal including at least a data signal and a clock signal to output data, the data signal being transmitted randomly, comprising the steps of:

resetting a control unit in response to a reset signal;

delaying the data signal, synchronously with the clock signal by a time period required for resetting the control unit;

temporally storing the data of the delayed data signal, synchronously with the clock signal, under the control of the control unit; and outputting the data, synchronously with the clock signal, under the control of the control unit after the storing is completed the transmission signal further includes a frame signal indicating a period of time when the data is present, and said resetting step includes issuing the reset signal to said control unit in response to the frame signal.

9. A method of receiving a transmission signal including at least a data signal and a clock signal to output data, the data signal being transmitted randomly, comprising the steps of:

resetting a control unit in response to a reset signal;

delaying the data signal synchronously with the clock signal, by a time period required for resetting the control unit;

temporally storing the data of the delayed data signal, synchronously with the clock signal, under the control of the control unit; and outputting the data, synchronously with the clock signal, under the control of the control unit after the storing is completed the transmission signal further includes a frame signal indicating a start timing of a time period for which the data is present, and said resetting step includes supplying the frame signal as the reset signal to said control unit.

10. A transmission and reception system comprising:

a transmission unit for transmitting a transmission signal including at least a data signal and a clock signal, the data signal being transmitted randomly, and a reception unit comprising:

delay means, operating synchronously with the clock signal, for delaying the data signal by a predetermined time period;

buffer means, operating synchronously with the clock signal, for temporally storing the data of the delayed data signal and outputting the data;

control means, operating synchronously with the clock signal, for controlling the storing and outputting operations of said buffer means; and resetting means, operating synchronously with the clock signal, for supplying a reset signal at start timing of the data signal to reset said control means said transmission unit transmits the data signal with a preamble portion having a predetermined bit pattern, said reception unit further comprises detecting means for detecting the preamble portion to generate a data presence signal, and said reset means includes means responsive to the data presence signal, for generating the reset signal.

11. A transmission and reception system comprising:

a transmission unit for transmitting a transmission signal including at least a data signal and a clock signal, the data signal being transmitted randomly, and a reception unit comprising:

delay unit, operating synchronously with the clock signal, to delay the data signal by a predetermined time period, buffer unit, operating synchronously with the clock signal, to temporally store the data of the delayed data signal and output the data;

control unit, operating synchronously with the clock signal, to control the storing and outputting operations of said buffer unit; and resetting unit, operating synchronously with the clock signal, to supply a reset signal at start timing of the data signal to reset said control unit, said transmission unit transmits the data signal with a preamble portion having a predetermined bit pattern, said reception unit further comprises detecting unit to detect the preamble portion to generate a data presence signal, and said reset unit includes a unit responsive to the data presence signal, to generate the reset signal.

12. A transmission add reception system comprising:

a transmission unit for transmitting a transmission signal including at least a data signal and a clock signal, the data signal being transmitted randomly, and a reception unit comprising:

delay means, operating synchronously with the clock signal, for delaying the data signal by a predetermined time period;

buffer means, operating synchronously with the clock signal, for temporally storing the data of the delayed data signal and outputting the data;

control means, operating synchronously with the clock signal, for controlling the storing and outputting operations of said buffer means; and resetting means, operating synchronously with the clock signal, for supplying a reset signal at start timing of the data signal to reset said control means said transmission unit transmits the transmission signal further including a frame signal indicating a period of time when the data is present, and said reset means responsive to the frame signal, for generating the reset signal.

13. A transmission and reception system comprising:

a transmission unit for transmitting a transmission signal including at least a data signal and a clock signal, the data signal being transmitted randomly, and a reception unit comprising:
   delay unit, operating synchronously with the clock signal, to delay the data signal by a predetermined time period,
   buffer unit, operating synchronously with the clock signal, to temporally store the data of the delayed data signal and output the data;
   control unit, operating synchronously with the clock signal, to control the storing and outputting operations of said buffer unit; and
   resetting unit, operating synchronously with the clock signal, to supply a reset signal at start timing of the data signal to reset said control unit, said transmission unit transmits the transmission signal further including a frame signal indicating a period of time when the data is present, and said reset unit responsive to the frame signal, to generate the reset signal.

14. A transmission and reception system comprising:

a transmission unit for transmitting a transmission signal including at least a data signal and a clock signal, the data signal being transmitted randomly, and a reception unit comprising:

delay means, operating synchronously with the clock signal, for delaying the data signal by a predetermined time period;

buffer means, operating synchronously with the clock signal, for temporally storing the data of the delayed data signal and outputting the data;

control means, operating synchronously with the clock signal, for controlling the storing and outputting operations of said buffer means; and resetting means, operating synchronously with the clock signal, for supplying a reset signal at start timing of the data signal to reset said control means said transmission unit transmits the transmission signal further including a frame signal indicating a start timing of a time period for which the data is present, and said reset means includes means responsive to the frame signal, for supplying the frame signal as the reset signal.

15. A transmission and reception system comprising:

a transmission unit for transmitting a transmission signal including at least a data signal and a clock signal, the data signal being transmitted randomly, and a reception unit comprising:
   delay unit, operating synchronously with the clock signal, to delay the data signal by a predetermined time period,
   buffer unit, operating synchronously with the clock signal, to temporally store the data of the delayed data signal and output the data;
   control unit, operating synchronously with the clock signal, to control the storing and outputting operations of said buffer unit; and
   resetting unit, operating synchronously with the clock signal, to supply a reset signal at start timing of the data signal to reset said control unit, said transmission unit transmits the transmission signal further including a frame signal indicating a start timing of a time period for which the data is present, and said reset unit includes a unit responsive to the frame signal, to supply the frame signal as the reset signal.

* * * * *